Aug. 8, 1950      L. S. KRAUS      2,517,792
METHOD OF AND APPARATUS FOR TREATMENT OF SEWAGE
Filed April 10, 1944
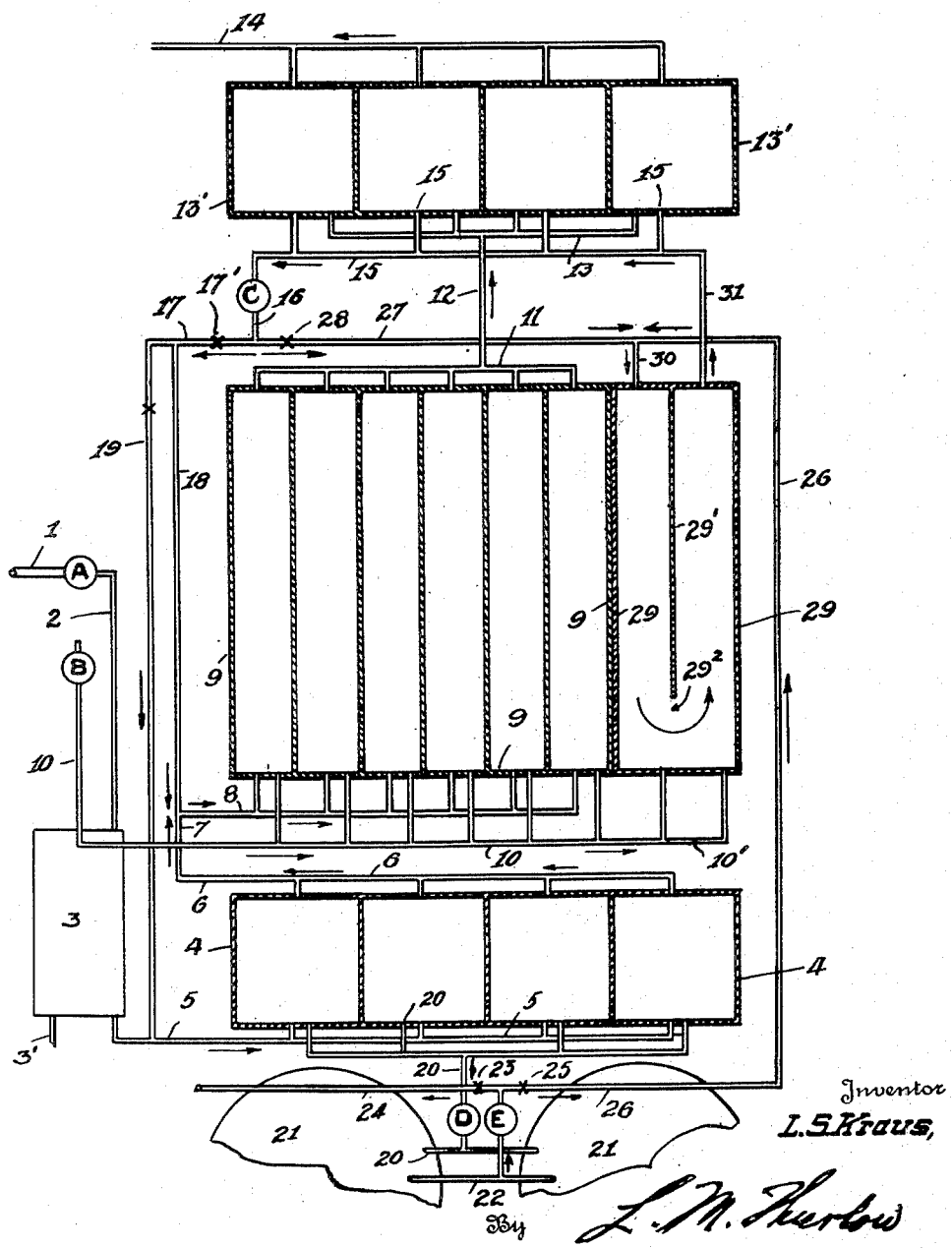
Inventor
L. S. Kraus, Patented Aug. 8, 1950

2,517,792

UNITED STATES PATENT OFFICE 2,517,792

METHOD OF AND APPARATUS FOR TREATMENT OF SEWAGE

Leon S. Kraus, Peoria, Ill.

Application April 10, 1944, Serial No. 530,314

13 Claims. (Cl. 210—2)

This invention relates to a method for controlling the settling characteristics of activated sludge commonly used in sewage treatment, and to the apparatus used in accomplishing this function. It includes the method and apparatus for the treatment of activated sludge with digested sludge and/or aeration and the means of improving the settling properties of another activated sludge which is treating sewage or industrial wastes by the use of the resulting activated sludge. The single figure of the drawing forming part hereof illustrates, as a diagram, an apparatus that may be employed in practicing the method of the present invention, the whole serving, also, as a flow chart.

Digested sludge herein referred to is the term commonly used for liquid materials containing suspended solids resulting from the methane fermentation of sewage sludges or industrial wastes.

In order to best make known my invention in the named procedure, an outline of a typical activated sludge plant is here presented, and the problems corrected by this procedure are stated.

In present day practice of sewage treatment by the known activated sludge method a difficulty known as "bulking" is encountered, particularly where the sewage being treated contains industrial wastes which contain appreciable dissolved carbohydrate concentrations. This "bulking" phenomenon manifests itself in a decrease in the ability of the activated sludge to settle, and also by the inability of the activated sludge to attain a high concentration of suspended solids. In extreme bulking conditions a filamentous bacteria predominates in the sludge and accentuates the named condition. This "bulking" often becomes so severe that it is impossible to separate the activated sludge from the purified sewage thus greatly reducing the efficacy of the activated sludge process and as a result there is a loss of large quantities of activated sludge in the plant effluent.

One known measure employed in the industry to indicate the degree to which activated sludge will settle is that known as the Mohlman Sludge Index. This is the volume in milliliters occupied by one gram (dry solids) of activated sludge when one liter of aeration tank liquor is allowed to settle for thirty minutes. This term "sludge index" is used later herein and is understood to mean this value.

In the normal activated sludge process two gross reactions take place simultaneously, namely, oxidation and production of solids that will settle. Oxidation consists of the biological conversion of carbonaceous materials to carbon dioxide and water. Production of solids that will settle is brought about by adsorption of colloids and dispersoids, and by bacterial growth. The extent to which these separate results take place in a given activated sludge plant depends largely upon the nature of the sewage being treated. If the sewage characteristics are such that the oxidation rate is very low, the production of settleable solids by absorption and bacterial growth is very high. This condition produces what is termed a bulking activated sludge. The solids so produced are of relatively low density which will not readily settle, and are high in organic matter content. On the contrary, sludge that readily settles and is of high density is low in organic matter content.

When there is a production of settleable solids of low density and high organic content in an activated sludge system it can be readily determined that such sludge will tend to become one of high organic content and low density at a rate which is a function of the ratio of activated sludge in the system to settleable solids produced. As the amount of sludge in the system is increased the time required to change the settling characteristics of the sludge also increases.

It can be shown mathematically that if an activated sludge plant produces 5000 lbs. (dry solids) of settleable material of 200 sludge index and 85% organic content in each cycle of operation, and if 50,000 lbs. (dry solids) of activated sludge of 100 sludge index and 70% organic content is the initial purifying medium, after 12 cycles of operation this activated sludge will have a sludge index of 170 and an organic content of 80.2%. If, however, 100,000 lbs. (dry solids) of the same activated sludge constitutes the system purifying medium it will take slightly more than 24 cycles instead of 12 cycles to reach the characteristics last named. It follows, then, that in this system holding the activated sludge solids at 50,000 lbs., the oxidation rate for maintaining a constant 80% organic content sludge will require twice the oxidation rate of that in the system containing 100,000 lbs. of activated sludge solids.

With this principle as a guide the desire and aim should be to maintain the suspended activated sludge in the usual aeration tanks at reasonably high concentrations. But in the normal activated sludge plant where low density settleable solids are produced this cannot be done because the sludge will not settle sufficiently well in the final settling tanks to effect a separation of the activated sludge and purified sewage when the activated sludge solids are high in concentration. In order to effectively settle the activated sludge and separate it from the purified sewage it is common practice to reduce the activated sludge solids in the aeration tanks. When the activated sludge solids in the system become sufficiently low conditions may be brought about which will stimulate the growth of filamentous bacteria, which in turn renders the activated sludge even less settleable, whereupon a condition ultimately arises where the activated sludge cannot be separated from the purified sewage. This results in a complete breakdown in the efficacy of the purification process.

If, however, the solids in the activated sludge system can be maintained at a high level despite the production of settleable solids of low density and high organic matter content by either the continuous, or "batch" introduction into the system of an activated sludge of high density and low organic matter content as a new procedure, the growth of filamentous organisms is discouraged, and the activated sludge has a more stable settling characteristic and is in better condition to absorb abnormally high loads. Thus the problem for controlling the density and settling character of activated sludge, where the rate of production of low density settleable solids is high and the rate of oxidation of the sludge is low, is either to separately prepare a treated activated sludge of high density, and of good settling characteristics, and mix it with the activated sludge of low density, thus improving the settling characteristics of the latter, or to increase the activated sludge density by oxidation in a separate sludge system or to bring about both conditions. In view of this and other foregoing problems my method can now be stated.

I have found that when digested sludge is added to activated sludge and the mixture is aerated for a period, for example, of from 10 to 36 hours, an activated sludge is produced with lower sludge index and a lower organic matter concentration than that of the original activated sludge. The amount of digested sludge so added can be as much, for example, as 20% of the volume of the initial activated sludge. Ammonia normally present in the digested sludge is converted to nitrate during the aeration period and the nitrate, in turn, affords a large supply of oxygen to assist the dissolved oxygen in maintenance of aerobic conditions for the activated sludge organisms.

It is found that when digested sludge is added to activated sludge in the proportions above noted and the mixture is aerated the treated activated sludge is capable of oxidizing organic matter at higher rate than could the activated sludge before addition of such digested sludge. Further, the sludge so produced is capable of purifying sewage in a manner common to activated sludge purification. Again, the resulting sludge index of a mixture of activated sludge and digested sludge after treatment by aeration results in an activated sludge with sludge index which is approximately the weighted average of the two component sludge indices. Thus, for instance, if an activated sludge of sludge index 150 be mixed with an equal amount (dry weight bases) of digested sludge of 2.5% suspended solids concentration (sludge index 40) the resulting activated sludge will have a sludge index of approximately 95. Thus by application of a proper quantity of digested sludge to activated sludge in an aeration tank it is possible to produce an activated sludge of predetermined sludge index.

It is found, also, that if after having produced an activated sludge of low sludge index (100 or less) by the above procedure, this sludge may be mixed with an activated sludge of high sludge index by a procedure herein referred to as an "interchange" by the use of apparatus of proper type or arrangement. The resulting activated sludge will then have a sludge index which is approximately the weighted average, on a dry solids basis, of the sludge indices of the two activated sludges as mixed. Thus it is possible to control the sludge index of an activated sludge used in the purification of sewage or industrial wastes to such a value that the proper amount of activated sludge solids will remain in the system. Again, it is found that when the treatment of activated sludge with digested sludge in sludge treatment aeration tanks is combined with an activated sludge produced by the treatment of sewage and industrial wastes by the process of this interchange, the process takes place in two steps. The action in the aeration tanks is largely that of settleable solids production, and the action in the sludge treatment tanks is largely that of oxidation.

I have found in addition to the above, that digested sludge can be added directly to the aeration tanks of the activated sludge process with some beneficial effects in the settling characteristics of the activated sludge, and this procedure may be used, if desired, but it would be considerably less effective than that employing the use of the activated sludge treatment tank and the said interchange.

Further, the preliminary settling tank sludge can be used to improve the settling characteristics of activated sludge but it is not as satisfactory a material for this purpose as is digested sludge.

In order to clearly make known the procedure in practicing my method, and to illustrate the means employed, the single figure of the accompanying drawing is provided, said figure also answering as a flow chart. It shows the apparatus commonly used for sewage treatment, as well as the added apparatus of my invention for cooperating therewith. To this end the disposition of the various parts of such apparatus and their relation to each other, together with the description of flow of materials and subsequent results in practice, are combined for the purpose of simplification. The sewage is brought to the treatment plant by pipe 1 through a pump A and a pipe 2 to a grit tank 3. Here the foreign materials such as sand and cinders are removed in the usual known manner through an outlet at 3'. The sewage passes from said grit tank into preliminary settling tanks 4 through a pipe 5, the settleable solids settling to the bottom, while the settled sewage flows out of the tanks through an effluent pipe 6, 7 where it mixes with return activated sludge, as will appear later, then entering a pipe 8 through which it flows into a series of aeration tanks 9 in parallel, while air from a blower B is forced through all of said aeration tanks 9 through a pipe 10. The mixture of activated sludge and preliminary settling tank effluent is, as usual, aerated for a sufficient time for complete purification. Following this the effluent from the aeration tanks flows by the pipe system 11, 12, 13 into final settling tanks 13'. In these tanks the activated sludge settles and the purified effluent flows out through pipe 14 as waste. The activated sludge which has settled in said final settling tanks 13' is withdrawn by a pump C through a pipe 15. Heretofore this sludge has been returned to the aeration tanks 9 by the equivalent of the herein pipes 16, 17 and 18, together with the effluent introduced into the said tanks 9 from the preliminary settling tanks 4. In the drawing this, of course, results in a mixture at the confluence of the said pipe 18 and the pipe 7, as will be understood. The pump also discharges part of this activated sludge into a pipe 19 which has connection with the pipe 17 and with the said pipe 5 which has connection with the preliminary settling tanks 4. The sludge in the latter tanks is drawn through the pump D by a pipe 20 into sludge digesting tanks 21 wherein a methane fermentation (commonly termed digestion) is continuously in progress. The digested sludge is withdrawn from these tanks at any elevation by a pump E through a pipe 22 and may be discharged by opening a valve 23 through a pipe 24 as waste.

In usual practice this sludge is disposed of for use as a fertilizer. Now, however, in order to accomplish my purpose herein this digested sludge is sent through a pipe 26, 27, the disposition thereof appearing later herein.

Included in the system is what may be termed a sludge treatment tank 29 wherein the mixture of activated sludge and digested sludge is aerated. This may have any suitable form for the purpose. However this instance, it includes two compartments created by a dividing wall 29' so arranged as to leave an opening 29² for the passage therethrough of the sludge from one compartment to the other. Connected with one compartment at one end of the tank at a position remote from the opening 29² is a pipe 30 which is connected into the pipe section 27 of the pipe 26, 27 already referred to. Through said pipe activated sludge from the pump C and the digested sludge from the pump E may flow as a mixture into the said sludge treatment tank 29. Also connected to the latter tank to communicate with the other compartment is a pipe 31 having connection with the previously mentioned pipe 15 extending from the final settling tanks 13' to the said pump C. Through this connection the treated activated sludge and the activated sludge from the said final settling tanks are made to mix and flow, but under control of the valves 17' to pipe 18 and 19, and valve 28 in pipe 27 near said pump. This procedure is the "interchange" heretofore mentioned, i. e., the interchange or admixture of the two sludges.

Air is supplied to the tank 29 by connections 10' extending to the same from the pipe 10. The introduction of the air into the combined sludges in this tank together, preferably, but not necessarily, with a circuitous movement of that material is my new manner of sludge treatment. The displacement period in this tank should be in the order of 10 to 36 hours. This treatment brings about a clarification of the turbid liquor normally present in the digested sludge portion of the mixture. It lowers the sludge index of the activated sludge and provides a considerable reservoir for carrying a large quantity of activated sludge in the system, since thereby the solids concentration may be brought to high level. Also it brings about the oxidation of the ammonia to form nitrate which, in turn, affords a large oxygen supply to the aerobic organisms in the activated sludge and stimulates the growth of oxydizing organisms so that much organic matter is destroyed, with the accompanying action of reducing the organic matter content of the sludge treated.

The production of nitrate is considerable in the sludge treatment tanks, reaching levels in the order of 100 parts per million parts of nitrogen in this form. This nitrate content not only affords a large oxygen supply to the organisms in the sludge treatment tanks but also supplies oxygen in the form of nitrate to the aeration tanks. Heretofore it has always been difficult to maintain a sufficient amount of dissolved oxygen in the influent end of the aeration tanks, but in my method by proper proportioning of the mixture of treated activated sludge and return activated sludge it is possible to supply an appreciable amount of oxygen in the form of nitrates to this portion of the tanks, such proportioning being governed by the proper setting of the valves 17', 28 relative to each other for opposite directions of flow.

While the apparatus illustrated is arranged for continuous flow of the material therethrough, my method may be used in "batch" if desired, by first producing a treated activated sludge in the sludge treatment tanks and then by making the interchange.

To provide the proper or desired proportion of activated sludge and digested sludge a flow meter, not shown, is placed in each of the pipe lines 26, 27, thus the rate of flow by adjustment of the valves 28 and 25 may be controlled.

I claim:

1. The method of improving the characteristics of an activated sludge used in sewage treatment, wherein digested sludge is added to activated sludge apart from raw sewage, the mixture is aerated, and the sludge so produced is used to purify sewage by adding the last named sludge to sewage, aerating the mixture, and separating the purified sewage from the activated sludge.

2. In a method of sewage treatment wherein an activated sludge and a digested sludge are both present, the method of treatment of activated sludge to bring about ready settling thereof, and to purify sewage, which includes the steps of aerating a mixture of activated sludge and digested sludge apart from raw sewage, mixing the sludge so produced with the first named activated sludge, adding the combined sludges to sewage, aerating the mixture, and separating the purified sewage from the activated sludge.

3. In a method of sewage treatment, the method of improving the settling characteristics of activated sludge resulting from said treatment, and which has indifferent settling characteristics, consisting in combining digested sludge with the said activated sludge apart from raw sewage, aerating the sludges so combined, intermingling the activated sludge so produced with the activated sludge having the named characteristics, and using the resultant sludge to purify sewage by adding the last named sludge to sewage, aerating the mixture, and separating the purified sewage from the activated sludge.

4. In a method of sewage treatment wherein are created activated sludge and digested sludge, the method of improving the settling characteristics of said activated sludge including the addition of digested sludge to the activated sludge in the proportion of substantially one volume of digested sludge and five volumes of activated sludge, aerating the combined sludges for from 10 to 36 hours, apart from raw sewage intermingling the activated sludge so produced with the activated sludge of different settling characteristics, and using the resultant sludge to purify sewage by adding the last named sludge to sewage, aerating the mixture, and separating the purified sewage from the activated sludge.

5. In a method of sewage treatment wherein activated sludge and digested sludge are present, the method of improving the said activated sludge by which it settles and purifies sewage readily, including adding digested sludge to the activated sludge in the proportion of substantially 1 volume of digested sludge to substantially 5 volumes of activated sludge, aerating the mixture apart from raw sewage, using the aerated mixture to improve the characteristics of another activated sludge by intermingling the two sludges, and using the resultant sludge to purify sewage by adding the last named sludge to sewage, aerating the mixture, and separating the purified sewage from the activated sludge.

6. In a method of continuous treatment of sewage including treatment by activated sludge, the method of improving the activated sludge of said treatment to thereby provide for settling and purifying sewage readily, consisting in continuously bringing together activated sludge and digested sludge, aerating the mixture apart from raw sewage until it has undergone adequate biological oxidation accompanied by the formation of high nitrate content, and introducing the sludge so produced into the sewage to be treated by the activated sludge and thereby providing an oxygen buffer in the form of nitrate to assist in the maintenance of aerobic conditions, and separating the purified sewage from the activated sludge.

7. In a method of sewage treatment employing a biological oxidation process and a sludge digestion process, the method of improving the efficacy of purification consisting in mixing sludge resulting from said biological oxidation process with a digested sludge, aerating the mixture until it has undergone biological oxidation as indicated by the conversion of the ammonia in the digested sludge to nitrate and nitrite nitrogen, and the addition of the sludge so produced to the influent to the biological oxidation process by adding the last named sludge to sewage, aerating the mixture, and separating the purified sewage from the activated sludge.

8. In combination with equipment of a sewage treatment plant employing a biological oxidation apparatus including a pipe for conveying sewage thereto, a final settling tank and a sludge digestion apparatus, a second biological oxidation apparatus, a pipe line connecting the sludge digestion apparatus and the influent to said second biological oxidation apparatus, a pipe line connecting the effluent of said second biological oxidation apparatus and the influent to the first named biological oxidation apparatus, a pipe line including a pump connected to and between the bottom of said final settling tank and the influent of said second biological oxidation apparatus and a discharge pipe for clarified liquor leading from said final settling tank.

9. In a method of treatment of sewage including biological oxidation and digestion, the method of improving the settling and purification of the biological oxidation of said treatment consisting in bringing together biologically oxidative sludge and digested sludge, aerating the mixture apart from raw sewage until it has undergone adequate biological oxidation accompanied by the formation of high nitrate content, introducing the sludge so produced into said biological oxidation and thereby provide an oxygen buffer in the form of nitrate to assist in the maintenance of aerobic conditions, and separating the purified sewage from the activated sludge.

10. In combination with a biological oxidation sludge digestion type of sewage treatment apparatus including an aeration tank, a pipe for leading sewage thereto and with effluent means, a final settling tank with influent means with a pipe for withdrawing sludge therefrom and with a pipe for removing purified sewage therefrom, and a digestion tank, a sludge treatment tank with influent and effluent means equipped with means for providing aeration and with a pipe including a pump for circulating sludge from the effluent to influent end of said sludge treatment tank, a pipe leading from the digestion tank of said apparatus to the influent end of said sludge treatment tank for discharge of any part of the contents of said sludge digestion tank into the sludge treatment tank, a pipe including a pump leading from the sludge withdrawal pipe of said final settling tank to the influent end of said sludge treatment tank, a control valve in each of the pipes for regulating the rate of flow through each, a pipe leading from the effluent end of said sludge treatment tank to the sludge withdrawal pipe of the final settling tank, a pipe including a pump from the sludge withdrawal pipe of the final settling tank to the pipe for leading sewage to the aeration tank, and a pipe from the effluent end of the aeration tank to the influent end of the final settling tank.

11. In combination with a biological oxidation sludge digestion type of sewage treatment apparatus including an aeration tank, a pipe for leading sewage thereto, a final settling tank and a digestion tank, a sludge treatment tank equipped with means for providing aeration, a pipe including a pump leading from the digestion tank of said apparatus to the influent end of said sludge treatment tank for the discharge of any part of the contents of said digestion tank into the latter, a pipe leading from the bottom of the said final settling tank into the said influent end of said sludge treatment tank and including a pump, a control valve in each of the pipes for regulating the rate of flow through each pipe, a pipe leading from the effluent end of the sludge treatment tank into the bottom of said final settling tank, a pipe including a pump leading from the bottom of said final settling tank to the said aeration tank, a pipe leading from the said aeration tank to the final settling tank, and a pipe leading from the final settling tank for the removal of purified sewage.

12. In a process of sewage treatment in which the sewage is subjected to a main biological oxidation treatment, the steps of segregating a portion of material in process containing nitrifying organisms, supplying such segregated material with both oxygen and nitrogenous food to induce rapid growth of such organisms to produce a culture rich in such organisms, and returning portions of such cultured organisms as an inoculum to the sewage in process at a point prior to said main biological oxidation treatment to produce and maintain an increased efficiency and degree of treatment in the main biological oxidizing treatment.

13. In a sewage treatment system comprising a biological oxidizing means, sludge settling means, means to convey the main flow of sewage in process to said biological oxidizing means and to said sludge settling means, means to remove final clarified effluent from the system, sludge digestion means and means to convey sludge from said sludge settling means to said sludge digestion means, the provision of an aerated culture means, means to convey into said culture means a portion of the material in process containing nitrifying organisms, means to convey material from said sludge digestion means into said culture means, and means to convey material out of said culture means into the main flow of sewage at a point at least as far ahead as said biological oxidizing means.

LEON S. KRAUS.

REFERENCES CITED

The following references are of record in the file of this patent:

UNITED STATES PATENTS

| Number | Name | Date |
|---|---|---|
| 1,743,550 | Imhoff | Jan. 14, 1930 |
| 1,904,916 | Coombs | Apr. 18, 1933 |
| 1,982,246 | Fischer | Nov. 27, 1934 |
| 1,986,332 | Fischer | Jan. 1, 1935 |
| 1,999,973 | Genter | Apr. 30, 1935 |
| 2,077,498 | Streander | Apr. 20, 1937 |
| 2,089,162 | Goudey et al. | Aug. 3, 1937 |
| 2,118,266 | Nordell | May 24, 1938 |
| 2,137,966 | Rankin | Nov. 22, 1938 |
| 2,228,017 | Pecker | Jan. 7, 1941 |
| 2,348,126 | Green | May 2, 1944 |
| 2,359,004 | Schlenz et al. | Sept. 26, 1944 |
| 2,404,223 | Durdin | July 16, 1946 |
| 2,458,163 | Hays | Jan. 4, 1949 |

FOREIGN PATENTS

| Number | Country | Date |
|---|---|---|
| 218,399 | Great Britain | June 27, 1924 |